May 30, 1939.  H. D. COLMAN  2,160,248
BELLOWS PISTON
Filed Dec. 30, 1936  4 Sheets-Sheet 1

INVENTOR
Howard D. Colman
BY
ATTORNEYS

May 30, 1939.  H. D. COLMAN  2,160,248
BELLOWS PISTON
Filed Dec. 30, 1936  4 Sheets-Sheet 3

INVENTOR
Howard D. Colman
BY
ATTORNEYS

Patented May 30, 1939

2,160,248

UNITED STATES PATENT OFFICE 2,160,248

BELLOWS PISTON

Howard D. Colman, Rockford, Ill.

Application December 30, 1936, Serial No. 118,296

38 Claims. (Cl. 188—152)

The present invention relates to improvements in pressure responsive elements having a piston action, and has particular reference to elements of this type that are hermetically sealed.

One of the primary objects of the invention resides in the provision of a novel pressure responsive bellows having an axially extensible and contractible peripheral wall reinforced against radial deflection and protected against physical injury.

Another object resides in the provision of a new and improved bellows reinforcement consisting of a series of closely arranged convolutions or rings adapted to resist rotational torque and interlocked to prevent uneven spread.

A further object is to provide a novel hydraulic brake actuator with hermetically sealed bellows pistons reinforced against wear and rupture.

Still another object resides in the provision of an automatic brake wear compensator mounted within the bellows pistons, and reinforcements for the pistons having a maximum range of extension as great as the range of adjustment of the compensator required for normal wear.

Various general objects reside in the provision of a hydraulic brake actuator which is simple and inexpensive in construction, easy to assemble, and efficient, reliable and long-lived in operation.

Further objects and advantages will become apparent as the description proceeds.

In the accompanying drawings.

Fig. 6ª is a perspective view of a detail.

The invention relates generally to a hermetically sealed pressure responsive element having a piston action. This element may be utilized for various purposes, but is particularly adapted for and hence shown as embodied in a hydraulic actuator for the wheel brake of an automotive vehicle.

The pressure responsive element is in the form of a sealed bellows diaphragm which may be made of any suitable resilient or flexible material, such, for example, as rubber or a rubber composition. Also, the diaphragm has a substantially constant transverse or piston area, and is variable in length. More particularly, the diaphragm is shown in the form of a rubber cup 1 having an axially extensible and contractible cylindrical wall 2 of uniform and constant diameter adapted to be anchored at one end and closed at the other end by a movable wall or head 3. The bellows or cup 1 may be subjected to the action of the pressure fluid in any desired manner to displace the end wall 3 axially, and in the present adaptation is shown as of the internal pressure type.

Figures 4, 5, 6, 6A, 7:
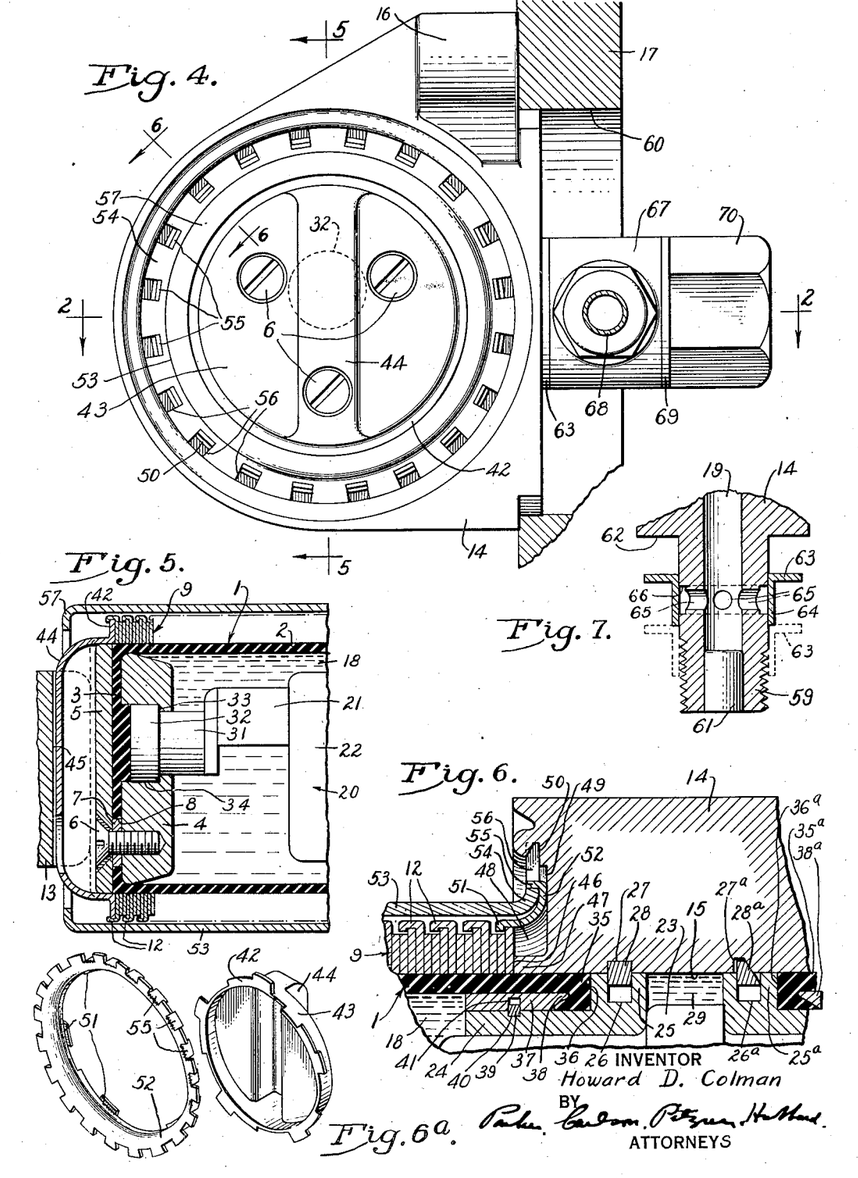
Fig. 4 is an end elevational view of the actuator.
Fig. 5 is a fragmentary vertical sectional view taken substantially along line 5—5 of Fig. 4.
Fig. 6 is a fragmentary sectional view taken substantially along line 6—6 of Fig. 4.
Fig. 7 is a fragmentary sectional view in the plane of line 2—2, and illustrating one step in the assembly of the pressure fluid inlet means.

It will be evident that the internal face of the wall 3 defines the effective piston area of the bellows or cup 1. To maintain this area substantially constant and rigid, the wall 3 is reinforced. More particularly, a relatively thick circular plate 4 having a diameter the same as the inside diameter of the cup 1 is disposed against the inside of the wall 3. Also, a relatively thin circular plate 5, the same in diameter as the exterior of the cup 1 is positioned against the outer face of the wall 3. The plates 4 and 5 are secured together by means of screws 6 (see Figs. 4 and 5), adapted to be tightened from the exterior, to clamp the wall 3 therebetween. Suitable washers 7, of which one is shown in Fig. 5, are disposed about the screws 6 in openings 8 in the wall 3, and serve to space the plates 4 and 5. The wall 3 is formed so that when free from deflection it is somewhat smaller in diameter than the external diameter of the cup 1 when assembled, and is somewhat thicker than the washers 7. However, when the screws 6 are fully tightened, the wall 3 is compressed to the thickness of the washers 7, thereby placing the rubber under heavy compression to effect a tight seal, and causing radial deflection to increase the external diameter to that of the plate 5. Thus, the assembly of the wall 3 and the plates 4 and 5 constitutes a rigid piston head.

Figure 1:
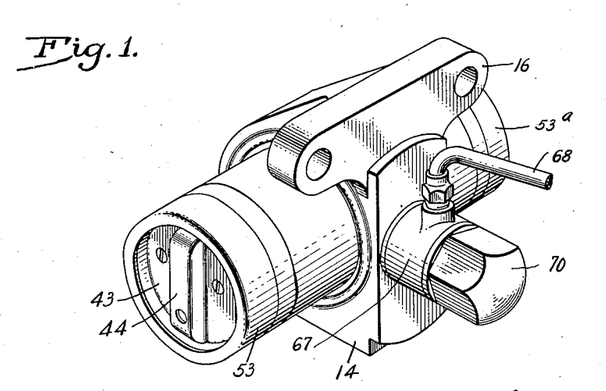
Figure 1 is a perspective view of a fluid pressure responsive actuator for automotive vehicle wheel brakes and embodying the features of my invention.
Figures 2, 3:
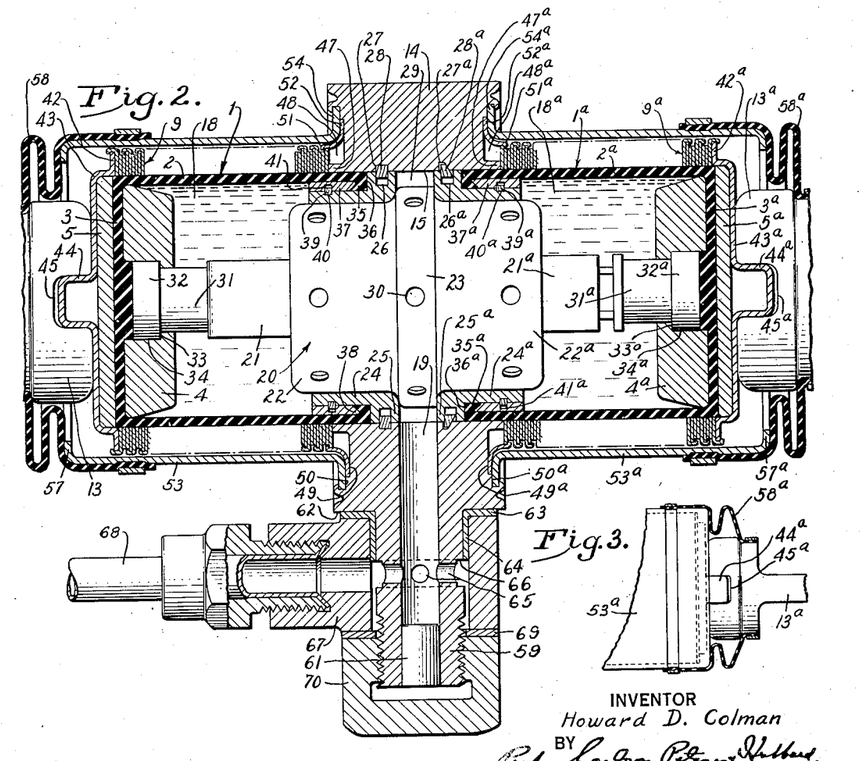
Fig. 2 is an enlarged horizontal axial sectional view of the actuator taken substantially along line 2—2 of Fig. 4.
Fig. 3 is a fragmentary plan view partially in section of one end of the actuator.
Figures 13, 14, 15:
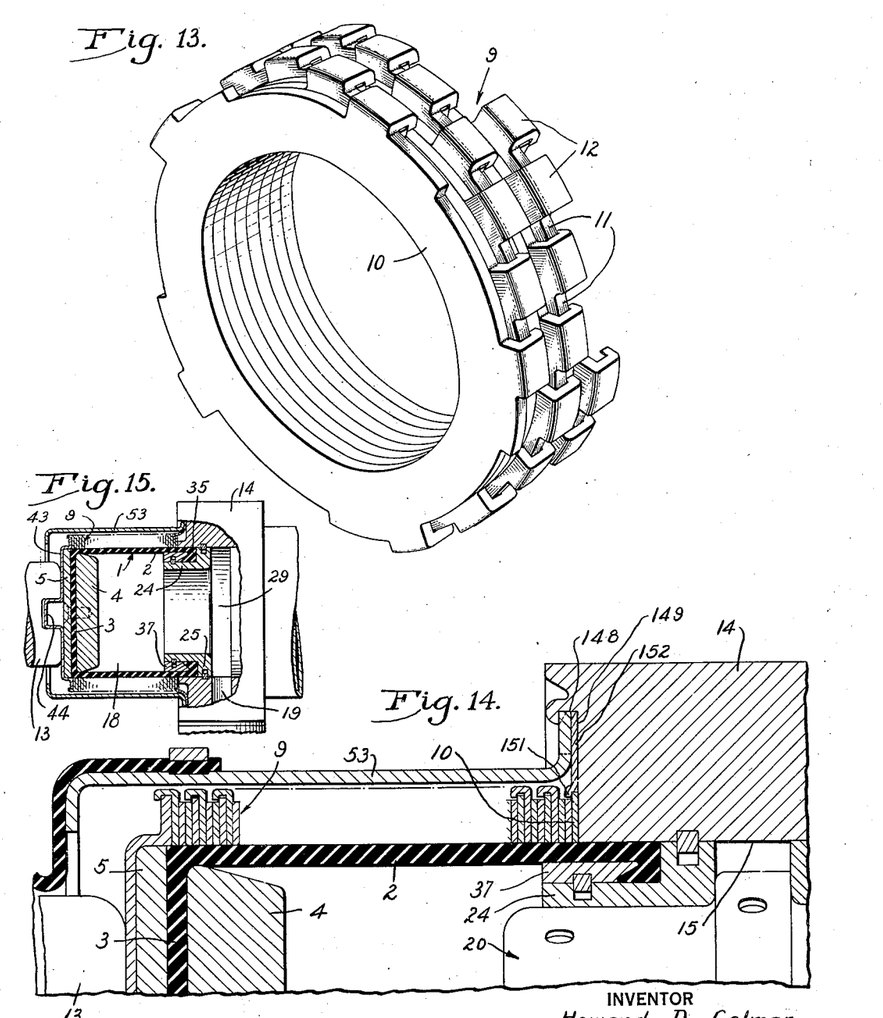
Fig. 13 is a view like Fig. 8, but illustrating a reinforcement comprising separate rings.
Fig. 14 is a fragmentary axial sectional view of a modified actuator including the reinforcement of Fig. 13.
Fig. 15 is a fragmentary sectional view of the actuator of Fig. 2 without a wear compensating adjuster.

Provision is made for reinforcing the cylindrical wall 2 against radial deformation by the action of the pressure fluid while permitting free axial deflection. In the present instance, a reinforcement 9, which is rigid and non-deformable diametrically but readily extensible and contractible axially, snugly encircles the wall 2 to support the latter against peripheral enlargement. The reinforcement 9 may be made of any suitable material, such, for example, as strip steel, and may be provided in various forms. Preferably, the reinforcement 9 consists of a plurality of closely spaced rings 10 which are adapted to move toward and from each other in response to axial contraction and elongation of the cup 1. These rings may be the turns or convolutions of a helical wire or strip as shown in Fig. 3, and in this event they are integrally connected to define a cylindrical coil or helix. They may also be provided in the form of separate plane rings as shown in Fig. 13.

When the cup 1 is fully contracted, the rings or convolutions 10 are in abutting engagement (see Fig. 10), and support every portion of the wall 2. When the cup 1 is extended, the rings or convolutions 10 separate to accommodate the increase in length (see Fig. 11). In this condition, the exterior of the wall 2 bridges the spaces A between the rings or convolutions 10. To prevent objectionable bulging or bloating of the wall 2 between the spaced rings or convolutions, which might occur if the spaces A were to become unduly large, the reinforcement 9 is constructed to keep the width of the spaces small. Thus, the width of the rings or convolutions is made relatively small so that a comparatively large number are provided for a given range of bellows movement, for example, an expansion ratio of 4 to 5, and the radial depth is made relatively large to provide the desired peripheral rigidity. Also, the rings or convolutions 10 are suitably interlocked to limit the maximum permissible separation of each set of adjacent convolutions and thereby prevent unequal separation beyond the imposed limits, particularly at full expansion when the pressure of the actuating fluid is the highest.

The lost-motion interlock may be provided in various forms, and in the present instance comprises a plurality of peripherally spaced radial lugs 11 rigid, and preferably integral, with the outer edge of each ring or convolution of the reinforcement 9, and a like number of hooks 12 projecting outwardly from the outer edge of one of the immediately adjacent rings or convolutions and then respectively over and into radial overlapping relation with the lugs. Each of the hooks 12 is larger in internal width than the width of the related lug 11, and the difference therebetween defines the maximum permissible clearance or space A between the related convolutions upon full expansion of the cup 1. The space A is such that the wall 2, taking into account its thickness and physical characteristics, will not be forced appreciably between the rings or convolutions even when subjected to the maximum pressure of the actuating fluid, and hence is substantially reinforced throughout and under all conditions of operation. It will be understood that, for partial extension of the cup 1, the spaces A will not attain maximum width, and that, even if the separation of the rings or convolutions should be somewhat unequal, no one space can exceed the predetermined maximum in width.

Figures 8, 9, 10, 12:
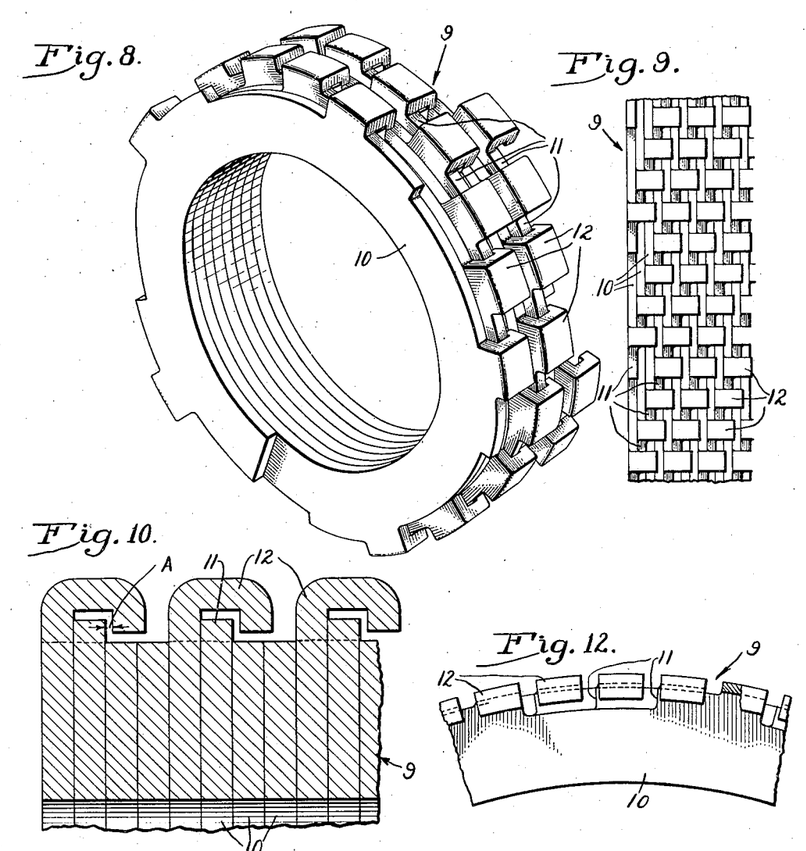
Fig. 8 is an enlarged perspective view of a part of an axially expansible peripheral spiral reinforcement for one pressure responsive element of the actuator.
Fig. 9 is a fragmentary plan development of the reinforcement shown in Fig. 8.
Fig. 10 is a fragmentary axial sectional view on an enlarged scale of either of the reinforcements of Figs. 8 and 13, and illustrates the same in contracted position.
Fig. 12 is a fragmentary end view of either reinforcement.
Figure 11:
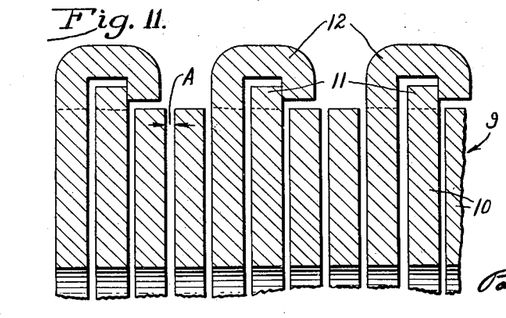
Fig. 11 is a view similar to Fig. 10, but illustrating either reinforcement in extended position.

The hooks 12, and hence the related lugs 11, for successive rings or convolutions 10, are staggered peripherally so as to avoid interference. For example, where the dimensions are as shown in Figs. 10 and 11, one hook 12 is provided for every fourth ring or convolution in any particular axial section. However, hooks 12 for the other rings or convolutions are provided in other angularly spaced axial sections.

The rings or convolutions 10 of the reinforcement 9 are held against relative angular displacement to retain the lugs 11 and hooks 12 in proper interlocking registration. The series of lugs 11 and hooks 12, which are spirally arranged, are threaded into operative relation by a relative angular movement, and then the end rings or convolutions are anchored in fixed angular position relative to the ends of the cup 1 so as to resist the torsional stresses set up by the fluid pressure.

It will be evident that the reinforcement 9 affords a rigid peripheral support for the cup 1, but is readily expansible and contractible upon the application of a very light force. The range of axial movement is comparatively small so that the diameter of the reinforcement remains substantially constant. Friction between the cup 1 and the reinforcement 9 is practically eliminated. The clearance spaces A are small and generally uniform, and hence the rubber or other material of which the cup 1 is made is not subjected to objectionable crimping, bending, pinching or excessive distention, thereby preventing physical injury and internal or molecular friction.

The reinforced hermetically sealed rubber cup or bellows 1 is especially adapted for use as a piston element for actuating a wheel braking element in automotive vehicles. Referring to Fig. 2, the hydraulic brake actuator, selected for purposes of illustration, is of the double end type having oppositely acting piston elements for spreading two brake elements, such, for example, as shoes 13 and 13a, into operative engagement with a coacting brake element, such, for example, as a rotary drum (not shown) against the action of retractile spring means (not shown) as is well understood in the art. The opposite ends of the actuator conveniently are substantially alike in construction, each being provided with a rubber cup or bellows as described, and hence it will suffice to describe one end in detail while identifying the corresponding parts of the other end by the same reference characters plus the letter a.

In the preferred form, the brake actuator comprises a hollow central body or base 14 formed with an axial bore 15, and rigid with a bracket 16 adapted to be mounted in a fixed position on a stationary brake backing plate 17 (see Fig. 4). Two rubber cups 1 and 1a are secured at their adjacent open ends respectively in opposite ends of the bore 15, and together define a common fluid space or chamber 18, 18a in communication centrally with an inlet and discharge passage 19 opening through the wall of the base 14.

Preferably, an automatic wear take-up adjuster 20 is mounted in the chamber 18, 18a to limit the retractile movement during brake release of each of the piston cups 1 and 1a. The adjuster 20 may be of any suitable type and hence the full details thereof are not shown herein. In general, the adjuster 20 is mounted in fixed position within the base 14, and has oppositely-extending independently-operable stops 21 and 21ª coacting respectively with the walls 3 and 3ª. Considering the left end of the actuator, the stop 21 is adapted for movement in either direction with the wall 3 when the fluid pressure is applied, but is limited in its return movement to a predetermined distance when the fluid pressure is released. This distance determines the brake clearance, and is always maintained regardless of brake wear. The adjuster 20 therefore is automatically operable in one direction to compensate for wear, and in the reverse direction upon brake application to reestablish the predetermined clearance in the event of brake drum contraction. An automatic adjuster of a different construction but functionally operable in the same manner is disclosed in my copending application, Serial No. 63,130, filed February 10, 1936, which has matured into Patent No. 2,130,875, September 20, 1938.

The adjuster 20 has a generally cylindrical casing with opposite ends 22 and 22ª, and an intermediate outer peripheral rib or flange 23 rigidly confined in spaced concentric or coaxial relation with the bore 15 between two adapter sleeves 24 and 24ª. These sleeves fit snugly on the end portions 22 and 22ª and against opposite sides of the rib 23, and have annular flanges 25 and 25ª respectively on their inner ends slidably engaging the bore 15. Annular grooves 26 and 26ª are formed respectively in the outer peripheral surfaces of the flanges 25 and 25ª, and register respectively with somewhat shallow grooves 27 and 27ª in the surface of the bore 15. Two split spring rings 28 and 28ª are expanded by their resiliency respectively from the grooves 26 and 26ª partially into the grooves 27 and 27ª to lock the sleeves 24 and 24ª, and hence the adjuster 20, in fixed position. The grooves 26 and 27 and the ring 28 are rectangular in cross-section to provide a positive axial lock. The groove 26ª is also rectangular in cross-section, but the groove 27ª and the ring 28ª are formed with complementary outer inclined cam sides (see Fig. 6) to take up looseness or play in the assembly and hence obtain a rigid lock. Also, the groove 27ª is narrower than the ring 28 to facilitate assembly as hereinafter described.

The rib 23 and the confining flanges 25 and 25ª define an annular groove 29 in communication with the fluid inlet passage 19. Suitable openings 30 in the rib 23 and the ends 22 and 22ª of the casing establish communication through the adjuster 20 between the groove 29 and the chamber 18, 18ª.

Considering the left end of the actuator, the adjustable stop 21 is operatively related to the movable wall 3 by engagement with a button 31 mounted eccentrically in the plate 4 (see Figs. 2 and 5). The button 31 has an enlarged head 32 seated against a shoulder 33 in a countersunk bore 34 opening through the plate 4, and is held in position by the pressure of the rubber of the wall 3 with a force greater than that of the retractile spring means of the brake. As a result, the adjuster 20 is cushioned against strains that might otherwise be set up by vibrations of the shoes 13 and 13ª. Also, the rubber affords a resilient connection adapted to relieve heavy compression that might otherwise be applied to the adjuster 20 in the event of drum contraction after expansion by heating.

To provide a hermetic or fluid-tight seal between the cup 1 and the base 14, the open inner end of the wall 2 is formed with an internal peripheral dovetail flange 35 which encircles the sleeve 24 and engages a shoulder 36 presented by the outer side of the flange 25. A clamp sleeve 37 is disposed on the outer end of the sleeve 24 inside of the cup 1, and is beveled at its inner end as indicated at 38 for engagement with the dovetail flange 35. A split spring lock ring 39 engaging in opposed annular grooves 40 and 41 in the sleeves 24 and 37 serves to hold the latter in position. The inner end portion of the cup wall 2 is so formed that when not deflected or under pressure it will slide readily into the end 16 of the bore 9. However, upon movement of the sleeve 37 inwardly into clamping position, the flange 35 is locked and compressed by the face 38 tightly against the sleeve 24 and the shoulder 36, and the resulting flow or deflection of the rubber causes the wall 2 to be forced against the surface of the bore 15 with considerable pressure. As a result, a fluid-tight seal is obtained. The wall 2, with the flange 35, is under compression, and transmits pressure against all of the surfaces by which it is restrained. Hydraulic pressure when applied, supplements the pressure resulting from deflection of the rubber, and hence the sealing pressure between the restraining surfaces at the inner end of the cup 1 is always great enough to provide a complete seal.

The reinforcement 9, which closely encircles the cup wall 2 and supports it against radial deflection by the internal fluid pressure, is non-rotatably anchored at one end to the adjacent side of the actuator base 14 and at the other end to the piston wall 3. To this end, the hooks 12 on the outer end convolution 10 are engaged over a plurality of peripheral lugs 42 on a cup-shaped plate or disk 43 (see Fig. 6ª) in which the plate 5 is seated. The lugs 42 are notched to engage the sides of the hooks 12 to prevent rotation in one direction, for example, a clockwise direction in Fig. 8 to prevent unwinding upon elongation when the reinforcement is in the form of a helix. A hollow vertical diametrical rib 44 on the disk 43 engages in a complementary groove 45 in the free end of the brake shoe 13, and hence prevents rotation of the lugs 42. Where the reinforcement 9 is in the form of a helix with the hooks 12 spirally arranged, the edge of the disk 43 and the hooks 42 are formed spirally to obtain an accurate fit with the end convolution 10. Likewise, where flat closed rings 10 are employed, as in Fig. 13, the edge of the disk 43 lies in a plane.

The inner end convolution 10 of the reinforcement 9 engages the end face 46 of an annular rib 47 on the adjacent side of the actuator base 14. Here also, the face 46 is formed either spirally for the reinforcement of Fig. 8 or plane for the einforcement of Fig. 13 to obtain a good surface fit, and thereby avoid any appreciable gap into which the rubber of the wall 2 might be forced under pressure. The rib 47 is defined by a stepped annular recess 48 formed in the base 14 and presenting concentric inner and outer bottom faces 49 and 50. To hold the inner end convolution 10 securely against the spiral face 46, the end lugs 11 are suitably engaged by a like number of hooks 51 similarly arranged spirally or in a plane as required on the inner edge of an axially flared retainer ring 52. These hooks 51 engage the sides of the end hooks 12 to hold the reinforcement against rotation in one direction, for example, in a clockwise direction as viewed in Fig. 8 to prevent the helix from partially unwinding under axial pressure.

In the assembly or formation of the helical reinforcement of Fig. 8, the metal strip is coiled, and the hooks 12 and lugs 11 are inter-threaded. The hooks 13 may be of such width that they will abut at the sides for a given diameter of reinforcement, and in this event an anchor at one end will, through the medium of the successive hooks, lock the intermediate convolutions as well as the other end convolution against rotation. When anchoring both ends of the helix as shown, the helix may be held under a slight angular tension by the hooks 42 and 51, and the hooks 12 may be spaced so as to permit the formation of helices of different diameter from the same preformed stock.

The outer marginal portion of the ring 52 flatly engages the face 49 and is centered by the recess 48. An anti-buckling tube or housing 53 encloses and closely encircles the reinforcement 9. The inner end of the tube 53 has a flat annular flange 54 which is rigidly secured in position against the face 50 by upsetting or riveting the metal of the base 14 about the outer edge, and which overlies the ring 52 and holds the latter securely against the face 49. To prevent relative rotation therebetween, the ring 52 is formed with a plurality of lugs 55 struck laterally from the outer margin into interfitting slots 56 in the flange 54. The riveting metal of the base 14 enters the outer ends of the slots 56 to secure the flange 54 against rotation. Hence, the reinforcement 9, the ring 52 and the tube 53 are all held against rotation.

Modified means for anchoring the inner end of the reinforcement, and particularly adapted for the flat rings 10, is illustrated in Fig. 14. In this form, an annular notch or recess 148 with a flat bottom face 149 extending to the bore 15, is formed in the side of the body 14, thus eliminating the rib 47 and the second bottom face 50. The inner end ring 10 of the reinforcement 9 is positioned directly against the inner marginal portion of the face 149. A flat retainer ring 152 is positioned directly against the outer marginal portion of the face 149, and has a plurality of off-set hooks 151 engaging over the lugs 11 of the end ring 10. The end flange 54 of the tube 53 is secured directly against the ring 152, and both are centered by the outer peripheral wall of the recess 149. In all other respects the construction is the same as described in connection with Figs. 1 to 13, and hence the same reference characters are employed.

The tube 53 serves as a protective enclosure for the cup 1 and the reinforcement 9, and also prevents buckling thereof under pressure. The outer end of the tube 53 is formed with an inturned flange 57 open to receive the free end of the brake shoe 13. A flexible bellows 58 is tightly secured at opposite ends respectively to the shoe 13 and the tube 53, and prevents the entry of dirt, grit and other foreign matter, and the escape of lubricant from the reinforcement 9.

In assembling the actuator, the sleeves 24, 24ª, with the rings 28, 28ª in the grooves 26, 26ª, are mounted on the ends 22, 22ª of the adjuster housing. Then the sleeves 37, 37ª, with the rings 39, 39ª in the grooves 40, 40ª are inserted into the cups 1 and 1ª, and slipped partially into the sleeves 24, 24ª. The rings 39, 39ª are expanded to encircle the sleeves 24, 24ª, and the flanges 35, 35ª are positioned against the shoulders 36, 36ª, but the sleeves 37, 37ª are not at this time moved into position to compress the rubber.

Now, the present assembly is inserted from the right into the bore 14 by an axial sliding movement, the rings 28, 28ª being compressed into the grooves 26, 26ª to pass the inner edge of the rib 47ª. In the continued movement, the ring 28, being wider than the groove 26ª, is forced past the groove 26ª. Since the rubber is not under compression, the cups 1, 1ª slide freely into and along the bore 14. Ultimately, the rings 28, 28ª reach and snap or expand partially into the grooves 27, 27ª to lock the assembly in axially centered position.

Now the sleeves 37, 37ª are moved inwardly until the rings 39, 39ª snap or contract partially into the grooves 40, 40ª, thereby placing the rubber at the inner ends of the cups 1, 1ª under a heavy pressure to effect a fluid seal. Displacement of the rubber causes engagement with the surface of the bore. This step in the assembly may be accomplished by applying pressure through the walls 2, 2ª against the outer ends of the sleeves 37, 37ª.

While the end walls 3, 3ª are relieved of pressure, the rings 52, 52ª and reinforcements 9, 9ª are slipped over the cups 1, 1ª into proper position respectively against the faces 49, 49ª and the ribs 47, 47ª. Then the plates 4 and 5 and 4ª and 5ª are clamped together, for example, in the case of plates 4 and 5 by tightening the screws 6, thereby compressing the walls 3, 3ª to effect a tight seal, and expanding them radially into tight engagement with the outer ends of the reinforcements 9, 9ª.

The disks 43, 43ª are now fitted over the plates 5, 5ª and anchored to the outer end convolutions 10 of the cup reinforcements 9, 9ª. Then, the anti-buckling tubes 53, 53ª are slipped over the reinforcements 9, 9ª and the flanges 56, 56ª are positioned against the faces 50, 50ª, with the lugs 55, 55ª projecting through the slots 56, 56ª. The flanges 56, 56ª are riveted in place, and serve to hold the rings 52, 52ª in place, with the hooks 51, 51ª engaging the end lugs 11, 11ª. Rotation of the end convolutions tending to result from axial extension of the reinforcements 9, 9ª is positively prevented by side engagement of the end hooks 12, 12ª with the hooks 51, 51ª.

The actuator is mounted on the backing plate 17. To complete the brake assembly, the bellows 58, 58ª are secured to the shoes 13, 13ª, and then the free ends of the latter are arranged to engage the plates 43, 43ª, with the vertical ribs 44, 44ª disposed in the slots 45, 45ª. Thereafter, the bellows 58, 58ª are slipped over and secured to the outer ends of the tubes 53, 53ª.

Fig. 15 illustrates the actuator of Figs. 2 to 6 without the adjuster 20. In this form, the radial dimension of the flange 25, may be increased, and the ring 37 made correspondingly thicker, to permit of a larger rubber flange 35 on the cup 1. The method of assembly is similar, the primary difference being that the rings 24, 24ª, instead of first being mounted on an adjuster 20 and then inserted therewith as a unit into one end of the bore 15, are inserted independently into opposite ends of the bore.

It will be understood that the passage 19 is connected to the pipe system of the brake. In the present instance, the passage 19 opens axially through a stem 59 (see Figs. 2 and 8) which projects through an opening 60 in the backing plate 17, and which is threaded externally on the outer end. A plug 61 of soft material, such as copper, is inserted with a tight press fit into the outer end of the passage 19. The actuator body 14 presents a flat face or shoulder 62 at the base of the stem 59. Disposed against the shoulder 62 is a soft metal gasket 63 having an axial sleeve 64 with a sliding fit on the stem 59. A plurality of radial ports 65 open from the passage 19 just beyond the end of the sleeve 64 to an annular groove 66 in the periphery of the stem 59. Mounted on the sleeve 64 against the gasket 63 is a tubular fitting 67 having a fluid-tight connection with a supply pipe 68 in communication with the groove 66. A soft metal gasket 69 is positioned against the outer end of the fitting 67, and the parts are connected in fluid-tight assembled relation by a cap nut 70 threaded onto the outer end of the stem 59.

In the assembly operation, the actuator is filled with braking fluid, and incidentally thereto all air is excluded. Then, the sleeve 64 is moved into position over the groove 66 (see Fig. 7). The fitting 67 is mounted on the sleeve 64, and gasket 69 is slipped onto the stem 59. Now, the nut 70 is threaded onto the stem 59, and quickly tightened, thereby sliding the sleeve 64 and the fitting 67 to uncover the groove 66, and clamping the parts together as shown in Fig. 2.

In operation, when the fluid pressure in the chamber 18, 18a is relieved, the rubber cups 1, 1a are contracted by the retractile force of the brake shoes 13, 13a. The idle position is determined by the adjuster 20 which defines and automatically maintains a predetermined braking clearance. When fluid pressure is applied, the cups 1, 1a are extended axially to spread the shoes 13, 13a. Throughout the range of movement, the cups 1, 1a are supported against peripheral enlargement by the reinforcements 9, 9a. By reason of the interlock between the convolutions of the reinforcements, the spaces therebetween during elongation are substantially uniform, and in any event never exceed a predetermined maximum width sufficiently small to exclude the rubber of the cups 1, 1a. As the stops 21, 21a are adjusted outwardly to compensate for wear, the size of the spaces A increases somewhat within the permissible range. The maximum extension of the reinforcements 9, 9a limits the range of adjustment, but by the time this is reached the friction elements are worn out. It will be evident that I have provided a new and improved hydraulic brake actuator which is hermetically sealed so that no loss of braking fluid can occur. The pressure responsive piston elements are protected against physical injury and therefore have a long life.

I claim as my invention:

1. A hydraulic brake actuator comprising, in combination, a base having a bore, an adapter sleeve mounted in a peripherally spaced and axially fixed position in said bore and having an external peripheral flange on its inner end slidably interfitting with said bore and defining an outwardly facing shoulder, a rubber cup having a closed outer end and having an open inner end extending into said bore about said sleeve, a flange on the inner end of said cup engaging said sleeve and said shoulder, a removable clamp sleeve secured on said first mentioned sleeve inside of said cup and compressing said flange against said first mentioned sleeve and shoulder to cause the rubber at the inner end of said cup to engage the confining surfaces with a heavy deflection pressure, an axially extensible and contractible and peripherally rigid reinforcement encircling said cup, means for anchoring one end of said reinforcement non-rotatably to said base, and means for anchoring the other end of said reinforcement non-rotatably for axial movement with the free end of said cup.

2. A hydraulic brake actuator comprising, in combination, a hollow base, a yieldable hermetically sealed cup closed at the outer end and having a fluid tight connection at the other end with said base, a cylindrical reinforcement encircling said cup and anchored at opposite ends respectively to said base and for movement with the free end of said cup, and an anti-buckling tube mounted on said base and closely encircling said reinforcement.

3. A hydraulic brake actuator comprising, in combination, a support having an open bore, two adapter sleeves mounted in axially fixed positions respectively in opposite ends of said bore and each having an external peripheral flange on its inner end slidably interfitting with said bore and defining an outwardly facing shoulder, two rubber cups having open inner ends extending respectively into opposite ends of said bore about said sleeves, a flange on the inner end of each cup engaging the associated sleeve and shoulder, two removable clamp sleeves secured respectively on said first mentioned sleeves inside of said cups and compressing said flanges against said associated sleeves and said shoulders to cause the rubber at the inner ends of said cups to engage the confining surfaces with a heavy deflection pressure, two axially extensible and contractible and peripherally rigid reinforcements encircling said cups, means for anchoring the inner ends of said reinforcements non-rotatably to said support, and means for anchoring the outer ends of said reinforcements non-rotatably for axial movement with the free ends of said cups.

4. A hydraulic brake actuator comprising, in combination, a hollow base, a yieldable hermetically sealed cup closed at the outer end and having a fluid tight connection at the other end with said base, a cylindrical reinforcement encircling said cup and anchored at opposite ends respectively to said base and for movement with the free end of said cup, an anti-buckling tube mounted on said base and encircling said reinforcement, an automatic wear compensator mounted in a fixed axial position within said base and having an adjustable stop for limiting the retractile movement of the free end of said cup.

5. A hydraulic brake actuator comprising, in combination, a support having a fluid pressure chamber, two yieldable hermetically sealed cups having closed end walls at their outer ends and having fluid tight connections at their inner ends with opposite sides of said support in communication with said chamber, and an automatic brake wear compensator for maintaining a predetermined brake clearance mounted in a fixed position in said chamber and having adjustable stops projecting oppositely into coacting relation with the outer end walls of said cups to limit the retractile movement thereof.

6. In a hydraulic brake actuator, in combination, an actuator base having a fluid pressure chamber and defining an external shoulder, a pressure responsive element exposed to said chamber, a stem projecting from said shoulder and having an axial passage opening therethrough to said chamber and an intermediate peripheral groove connected through radial ports to said passage, a plug closing the outer end of said passage, a gasket having a sleeve slidable on said stem and adapted to overlie and close said groove, a pipe fitting mounted on said sleeve and disposed at one side against said gasket and movable inwardly along said stem to position said gasket against said shoulder and thereby uncover said groove and having a passage opening beyond said sleeve for communication with said groove, a gasket on said stem disposed against the other side of said fitting, and a cap nut threaded on the outer end of said stem against said last mentioned gasket for forcing said fitting inwardly to clamp the movable parts tightly against said shoulder.

7. In a hydraulic brake actuator, in combination, an actuator base defining a fluid pressure chamber for a piston element, a stem projecting from a shoulder on said base, and having a longitudinal passage opening to said chamber and a radial port opening to said passage, a gasket having a sleeve adapted in an intermediate position to close said port and slidable on said stem from over said port into position against said shoulder, a pipe fitting on said sleeve and disposed at one side against said gasket and having a passage adapted for communication with said port, a gasket on said stem against the other side of said fitting, and a cap nut threaded on said stem against said last mentioned gasket for clamping said fitting in position with a fluid-tight seal.

8. In a hydraulic brake actuator, in combination, an actuator base with piston elements defining an internal fluid pressure chamber, a stem projecting from said base and having a passage opening from the periphery thereof to said chamber, a pipe fitting slidable on said stem into position against said base and having a passage adapted to communicate with said first mentioned passage when said fitting is in said position and adapted to be out of communication with said first mentioned passage when said fitting is in an intermediate position of assembly, and means for clamping said fitting against said base.

9. In a hydraulic brake actuator, in combination, an actuator base with piston elements defining an internal fluid pressure chamber, a stem projecting from said base and having a passage opening from the periphery thereof to said chamber, a gasket having a sleeve slidable on said stem from a position closing said passage into a position against said base opening said passage, a pipe fitting on said sleeve and disposed at one side against said gasket and having a passage opening beyond said sleeve, and means on said stem for engaging the other side of said fitting to clamp said gasket and fitting against said base whereby to bring said passages into communication.

10. A cylindrical bellows reinforcement comprising, in combination, a plurality of axially disposed convolutions rigid against radial deflection and relatively movable axially into and out of abutting engagement, and lost motion interlocking means connecting the outer peripheral edges of said convolutions to limit the separating movement thereof.

11. A cylindrical bellows reinforcement comprising, in combination, a plurality of axially disposed convolutions rigid against radial deflection and relatively movable axially into and out of abutting engagement, and a plurality of interlocking lugs and hooks on successive convolutions for limiting the axial separation thereof.

12. An axially contractible and extensible and peripherally rigid cylindrical piston bellows reinforcement comprising, in combination, a plurality of axially aligned convolutions movable axially into varying degrees of spaced relation and each consisting of a metal strip on edge of a relatively small thickness and a relatively large radial width, and lost motion interlocking means interconnecting the adjacent convolutions to limit the spread thereof and to insure a uniform spread of all the convolutions at maximum extension.

13. A cylindrical bellows reinforcement comprising, in combination, a single cylindrical helix defining a plurality of axially aligned spiral convolutions rigid against radial deflection and relatively movable axially into varying degrees of spaced relation, and lost motion interlocking means rigid with and connecting each pair of adjacent convolutions to limit the separating movement thereof.

14. A pressure responsive piston element comprising, in combination, a cylindrical non-metallic bag of flexible air and fluid impervious material, and a reinforcement closely encircling said bag and having a plurality of axially disposed convolutions all in direct internal contact with said bag and rigid against radial deflection and relatively movable axially into varying degrees of spaced relation, and lost-motion interlocking means rigid with and connecting successive convolutions to limit axial separation thereof.

15. A pressure responsive hermetically sealed piston element comprising, in combination, a cup of flexible non-metallic air and fluid impervious material and having a peripheral wall and a closed end wall, an axially contractible and extensible and peripherally rigid reinforcing metal helix defining a plurality of axially aligned convolutions closely engaging said peripheral wall, lost motion interlocking means connecting said convolutions to limit the axial spread between each pair of adjacent convolutions, and means for anchoring the ends of said helix against angular displacement relative to said cup.

16. An axially contractible and extensible and peripherally rigid cylindrical piston bellows reinforcement comprising, in combination, a metal helix defining a plurality of axially aligned convolutions, lost-motion interlocking means connecting said convolutions to limit the axial spread between each pair of adjacent convolutions, and means for anchoring the ends of said helix against relative angular displacement.

17. An axially contractible and extensible and peripherally rigid cylindrical piston bellows reinforcement comprising, in combination, a plurality of axially aligned convolutions movable axially into varying degrees of spaced relation and each consisting of a metal strip on edge of a relatively small thickness and a relatively large radial width, a plurality of peripherally spaced lugs on each of said convolutions, a plurality of peripherally spaced hooks on each of said convolutions and extending in spaced overlapping relation with the lugs on one next adjacent convolution to define a lost motion connection limiting the axial spread, and means for preventing relative rotation of said convolutions to maintain said lugs and hooks in operative relation.

18. An axially contractible and extensible and peripherally rigid cylindrical piston bellows reinforcement comprising, in combination, a cylindrical helix defining a plurality of axially aligned convolutions movable into varying degrees of spaced relation and each consisting of a metal strip on edge of a relatively small thickness and a relatively large radial dimension, a plurality of alternate spirally arranged lugs and hooks on the outer peripheral edge of said helix with the hooks of each convolution engaging loosely over the lugs of the next convolution to limit the spread of all adjacent convolutions uniformly to a distance less than the thickness of said strip and with the hooks of successive convolutions being peripherally staggered to avoid interference of said interlocking lugs and hooks, an anchor ring having a plurality of spirally arranged hooks interlocking with the lugs on one end convolution, and a second anchor ring having a spiral flange interlocked with the hooks on the other end convolution.

19. A hermetically sealed bellows piston comprising, in combination, a rubber cup having a cylindrical wall open at one end and closed at the other end by an end wall, a circular plate disposed against the inside of said end wall, a circular plate disposed against the outside of said end wall, metal washers in said end wall between said plates and of a thickness less than that of said end wall, and screw means for clamping said plates together against said washers to place said end wall under compression and to define a rigid piston head.

20. A hermetically sealed bellows piston comprising, in combination, a rubber cup having a peripheral wall open at one end and closed at the other end by an end wall, a reinforcement encircling said peripheral wall, a plate disposed against the inside of said end wall, a plate disposed against the outside of said end wall, metal spacers in said end wall between said plates and of a thickness less than that of said end wall, and screw means for clamping said plates together against said spacers to place said end wall under compression and thereby to expand said end wall radially into engagement with said reinforcement.

21. A hermetically sealed bellows piston comprising, in combination, a base having a fluid chamber, a rubber cup having a fluid-tight connection at the open end with said base and in communication with said chamber and having a closed wall at the other end, said other end projecting from said chamber into freely spaced relation to said base, longitudinally extensible and contractible means peripherally reenforcing the projecting portion of said cup, and means for reinforcing said end wall to maintain said wall in a flattened condition.

22. A hermetically sealed bellows piston for actuating a brake shoe and comprising, in combination, a base having a fluid pressure chamber, a generally cylindrical rubber cup having a peripheral wall connected to said base for communication with said chamber and extending from said chamber into freely spaced relation to said base for free axial extension and contraction and having a transverse wall closing the free end of said peripheral wall, and a rigid reinforcement for said transverse wall operatively spaced from said base and said chamber and adapted to coact with the brake shoe.

23. A hermetically sealed bellows piston for actuating a brake shoe and comprising, in combination, a base having a fluid pressure chamber, a generally cylindrical rubber cup having a peripheral wall connected to said base for communication with said chamber and extending from said base for free axial extension and contraction and having a transverse wall closing the free end of said peripheral wall, a thin circular plate overlying the exterior of said transverse wall, and a cup-shaped plate receiving said circular plate and having a vertical rib and slot connection with said shoe.

24. A hermetically sealed bellows piston for actuating a brake shoe and comprising, in combination, a base having a fluid pressure chamber, a generally cylindrical rubber cup exposed to the pressure in said chamber and having a peripheral wall connected to said base and extending from said base for free axial extension and contraction and having a transverse wall closing the free end of said peripheral wall, a rigid reinforcement for said transverse wall and adapted to coact with the brake shoe, and an axially extensible and contractible reinforcement for said peripheral wall and anchored at opposite ends respectively to said base and said first mentioned reinforcement.

25. A hydraulic brake actuator comprising an open bore, an adapter sleeve mounted in peripherally spaced and axially fixed position in said bore and having an external peripheral flange on its inner end slidably interfitting with said bore and defining an outwardly facing shoulder, a rubber cup having a closed outer end projecting from said bore and having an open inner end extending into said bore about said sleeve, a flange on the inner end of said cup engaging said sleeve and said shoulder, and a removable clamp sleeve secured on said first mentioned sleeve inside of said cup and compressing said flange against said first mentioned sleeve and said shoulder to cause the rubber at the inner end of said cup to engage the confining surfaces with a heavy deflection pressure.

26. A bellows piston comprising, in combination, a rubber cup closed at one end by a transverse wall, and having an inner peripheral flange at the other end, a mounting sleeve inserted into said cup and defining an annular external shoulder engaging said flange, said sleeve being formed with a recess open to the external periphery, a clamp sleeve within said cup and slidable on said mounting sleeve for compressing said flange from the interior against said sleeve and said shoulder, said clamp sleeve being formed with a recess open to the inner periphery and movable into registration with said first mentioned recess, and spring detent means adapted to be deflected into one of said recesses in the assembly of said sleeves and to snap therefrom partially into the other of said recesses to lock said sleeves together.

27. In a hydraulic brake actuator having a base with a bore therein and a recess in the surface of said bore, a bellows piston comprising, in combination, a cup of a flexible material open at one end and hermetically closed at the other end, an adapter sleeve projecting at one end into the open end of said cup and attached thereto, the other end of said sleeve being adapted for a sliding fit in said bore and having a recess movable into registration with said first mentioned recess, and spring lock means adapted to be deflected into one of said recesses and to snap therefrom partially into the other of said recesses upon movement of said recesses into registration to lock said sleeve in said bore.

28. In a hydraulic brake actuator, in combination, a base defining a chamber, a cup of a flexible material open at one end and hermetically closed at the other end to constitute a bellows piston, an adapter member attached to the open end of said cup and insertable therewith into said chamber, and detent means for automatically locking said member in said chamber upon movement of said member into a predetermined position.

29. In a hydraulic brake actuator, in combination, a base defining a chamber, a cup of a flexible material open at one end and hermetically closed at the other end to constitute a bellows piston, an adapter member projecting into the open end of said cup and insertable therewith into said chamber, means for locking said adapter member in a predetermined position in said chamber, and means on said adapter member operable to compress the marginal edge portion of the open end of said cup to deflect said material into engagement with said member and the surface of said chamber with a heavy sealing pressure.

30. A hydraulic brake actuator comprising, in combination, a hollow base, a yieldable hermetically sealed cup having a closed yieldable wall at its outer end and a fluid-tight connection at the other end with said base, a button disposed against the inner face of said wall, means for holding said button against said face, an automatic brake wear adjuster mounted in a fixed position in said base and having an adjustable stop engaging said button for movement reversibly with said wall and to limit the retractile movement of said wall in accordance with a predetermined brake clearance.

31. A hydraulic brake actuator comprising, in combination, a base having a bore in one side, an annular flange about said bore with a spiral end face and an annular recess about said flange, a yieldable hermetically sealed cup closed at the outer end and having a fluid-tight intercommunicating connection at the other end with said bore, a helical reinforcement encircling said cup, and means secured in said recess for confining one end convolution of said reinforcement non-rotatably against said face.

32. A hydraulic brake actuator comprising, in combination, a base having a bore in one side, an annular flange about said bore and an annular recess about said flange, a yieldable hermetically sealed cup closed at the outer end and having a fluid-tight intercommunicating connection at the other end with said bore, a reinforcement comprising a plurality of axially aligned and movable rings or convolutions encircling said cup, and means anchored in said recess for securing one end convolution in position against said flange.

33. A hydraulic brake actuator comprising, in combination, a base having a bore in one side, an annular flange about said bore and an annular recess about said flange, a yieldable hermetically sealed cup closed at the outer end and having a fluid-tight intercommunicating connection at the other end with said bore, a reinforcement comprising a plurality of interlocked axially aligned rings or convolutions encircling said cup, a retainer ring seated in said recess and having a flared inner edge engaging one end convolution to confine the latter non-rotatably against said flange, an anti-buckling tube encircling said reinforcement and having an end flange seated in said recess over said retainer ring to hold said retainer ring in position, an interfitting non-rotatable slot and lug connection between said retainer ring and tube, and rivet means for securing said flange in said recess and projecting into the slot of said last mentioned connection to hold said tube against rotation.

34. A cylindrical bellows reinforcement comprising, in combination, a plurality of separate axially disposed rings rigid against appreciable radial deflection and relatively movable axially toward and from each other, and lost motion interlocking means connecting the outer peripheral edges of said rings to limit the separating movement thereof.

35. A hydraulic brake actuator comprising, in combination, a base having a central bore and a concentric notch in one side, a yieldable hermetically sealed cup closed at the outer end and having a fluid tight connection with said base at the other end for communication with said bore, a reinforcement comprising a plurality of axially disposed rings encircling said cup, the inner end ring being disposed against the bottom of said notch, a retainer ring seated against the bottom of said notch about said last mentioned ring and confining the latter non-rotatably in position, an anti-buckling tube encircling said reinforcement and having an end flange disposed against said retainer ring, means interlocking said retainer ring and said flange against relative rotation, and means on said base for securing said flange and retainer ring in position.

36. A hydraulic brake shoe actuator comprising, in combination, a support, a rubber cup closed at one end and connected at the other end to said support to constitute an axially extensible and contractible bellows piston, an anti-buckling tube connected at one end to said support, and an axially extensible and contractible peripheral reenforcement for said cup interposed between said cup and said tube.

37. A hydraulic brake shoe actuator comprising, in combination, a support, a rubber cup closed at one end and connected at the other end to said support to constitute an axially extensible and contractible bellows piston, an anti-buckling tube encircling said cup and open at one end to permit direct engagement between the brake shoe and the closed end of said cup and having a flange at the other end engaging said support, means securing said flange non-rotatably to said support, and an axially extensible and contractible reenforcement rigid against radial deformation and interposed between said cup and said tube to restrain said cup against peripheral enlargement.

38. An axially contractible and extensible and peripherally rigid generally cylindrical piston bellows reenforcement comprising, in combination, a plurality of separate axially disposed rings movable axially into varying degrees of spaced relation and each being relatively thin and having a relatively large radial width, a plurality of peripherally spaced lugs on each of said rings, a plurality of peripherally spaced hooks on each of said rings and extending into spaced overlapping relation with the lugs on one next adjacent ring to define a lost motion connection limiting the axial spread, said rings being relatively rotatable in one direction to bring said hooks and lugs into overlapping relation.

HOWARD D. COLMAN.